FLUID VARIABLE LIGHT DEFLECTOR
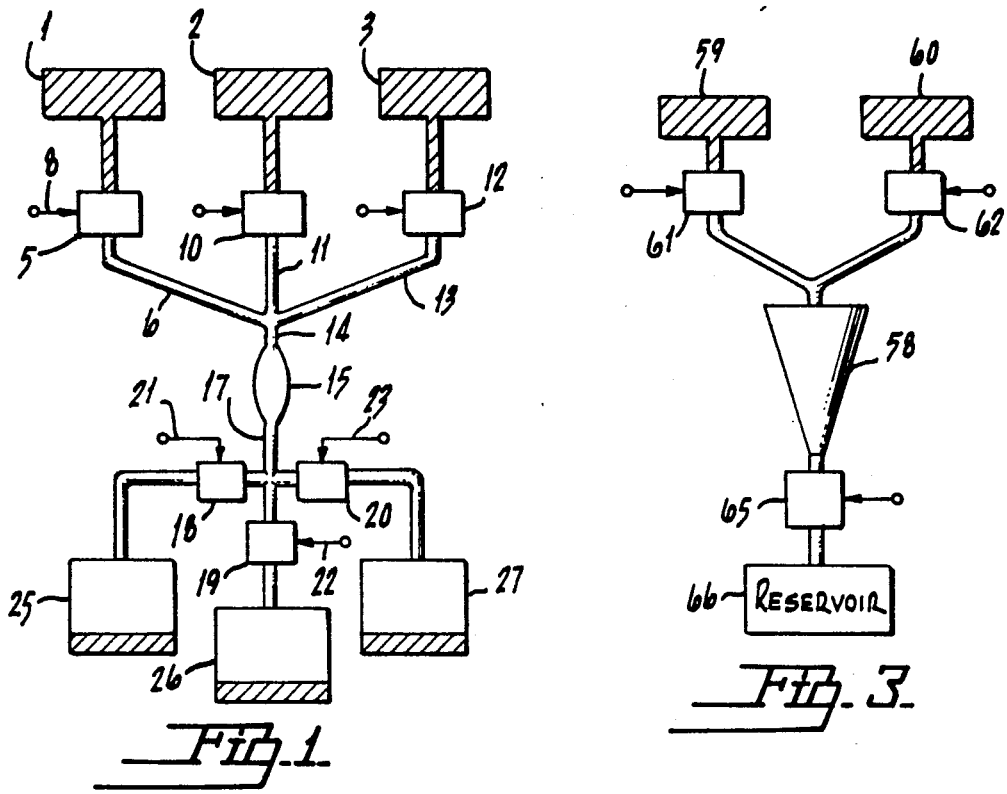
Fig. 1
Fig. 3
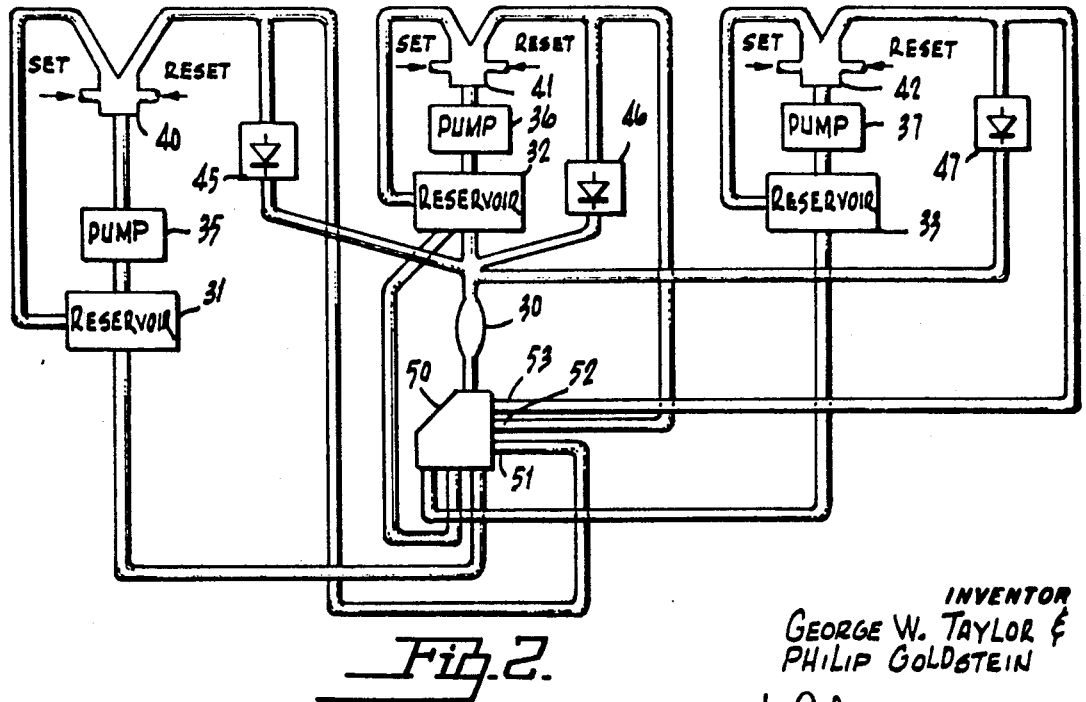
Fig. 2
INVENTOR
GEORGE W. TAYLOR &
PHILIP GOLDSTEIN Sept. 20, 1971 G. W. TAYLOR ET AL 3,606,523
FLUID VARIABLE LIGHT DEFLECTOR
Filed May 14, 1968 2 Sheets-Sheet 2
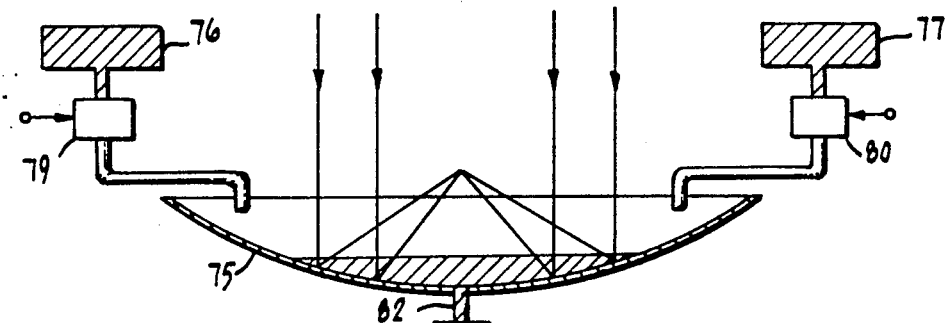
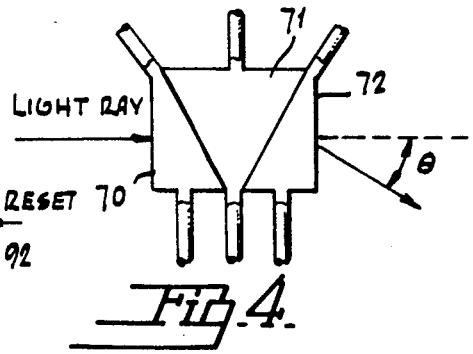
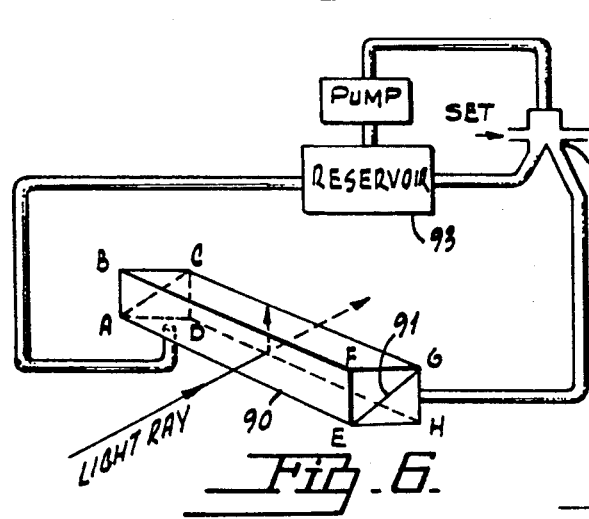
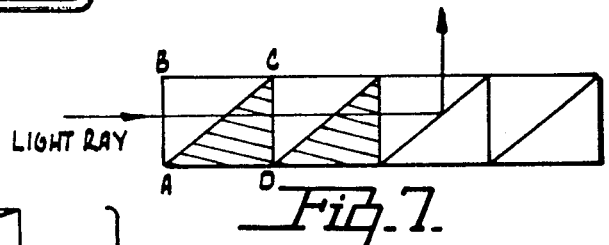
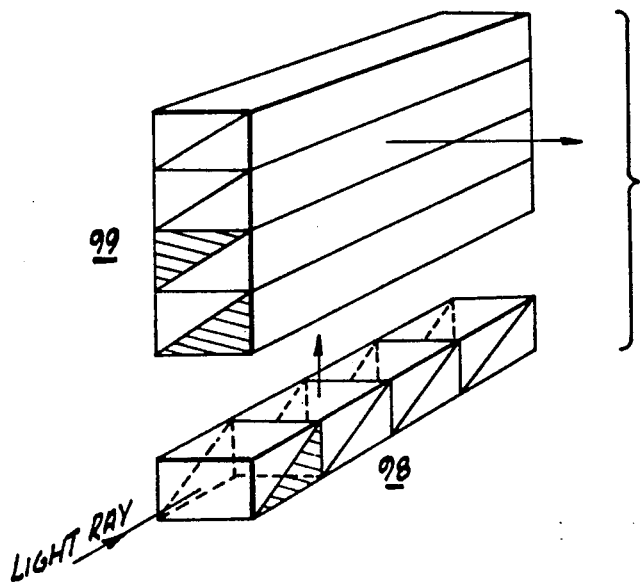
INVENTOR
GEORGE W. TAYLOR &
PHILIP GOLDSTEIN
BY H. Christoffersen
ATTORNEY

United States Patent Office 3,606,523
Patented Sept. 20, 1971

3,606,523
FLUID VARIABLE LIGHT DEFLECTOR
George William Taylor, Princeton, and Philip Goldstein, North Brunswick, N.J., assignors to RCA Corporation
Filed May 14, 1968, Ser. No. 728,957
Int. Cl. G02b *1/06, 3/12;* G06m *1/12*
U.S. Cl. 350—179          6 Claims

ABSTRACT OF THE DISCLOSURE

A light deflection apparatus using hollow optical elements in the form of lenses and prisms and means for selectively introducing differing refractive index fluid into the elements to alter the optical properties of the elements. A further apparatus embodiment uses a longitudinally divided prism for changing the prism exit direction of a transitory light beam by selectively creating total reflection at an interface within the prism between a permanent transparent medium and a selectively introduced transparent fluid.

BACKGROUND OF THE INVENTION

The need to control light deflection for use in display systems, hologram memory systems and high speed printers has produced many electronic and mechanical prior art devices. However, none of the prior art devices possesses the inherent operational advantages exhibited by fluid logic devices. These advantages are an insensitivity to shock, temperature, and radiation coupled with a low weight and low cost construction using modern etching techniques. Accordingly, the use of fluid logic devices to control the deflection of light beams provides a solution to many of the problems associated with the prior art devices while adding the further advantage of mechanical longevity.

SUMMARY OF THE INVENTION

A light deflector using fluid control devices, such as fluid amplifiers, to introduce desired refractive fluids into hollow transparent enclosures forming various optical elements such as lenses, prisms, and mirrors. The substitution of fluids produces a change in the optical property of the affected optical element. In the case of the lens, the focal point is changed. In the case of the prism, the deviation, or refraction of a transitory light beam is altered. In another prism embodiment using a longitudinally divided hollow body forming adjoining prisms, the effect of total reflection at an interface of the prisms controls the body exit point of a traversing light beam. For a reflective focusing mirror, the focal point is changed by an alteration in the refractive liquid suspended before the reflective surface.

BRIEF DESCRIPTION OF THE DRAWINGS

FIG. 1 is a pictorial illustration of a light deflecting system embodying the present invention;

FIG. 2 is another embodiment of the present invention;

FIG. 3 is still another embodiment of the present invention;

FIG. 4 is a modification of the embodiment shown in FIG. 3.

FIG. 5 is a simplified representation of another embodiment of the invention;

FIG. 6 is another light deflecting system embodying the present invention;

FIG. 7 is a modification of the embodiment shown in FIG. 6; and

FIG. 8 is an X–Y light deflecting system, also embodying the present invention.

DETAILED DESCRIPTION

In FIG. 1, there is shown a light deflecting apparatus having three reservoirs, 1, 2, 3 containing respective liquids having mutually different refractive indices. A first valving means 5 is connected to the first reservoir 1 to control the flow of fluid therefrom into a first fluid conduit 6. The valving means 5 is controlled by an input control signal applied on input line 8 to the valve means 5. The valve means 5 may be any suitable fluid control means, e.g., a fluid amplifier. Similarly, a second valve means 10 is connected between the second reservoir 2 and a second fluid conduit 11 while a third valve means 12 is connected between third reservoir 3 and a third fluid conduit 13.

The fluid conduits 6, 11, 13 are joined into a main fluid conduit 14 which is connected to the input of a transparent hollow lens body 15. An output fluid line 17 from the lens body 15 is closely coupled to the inputs of three output valve means 18, 19, and 20. The three output valve means 18, 19, and 20 are controlled by input control signals applied on input lines 21, 22, and 23, respectively. The output of the first output valve means is connected to a fourth reservoir 25; the output of the second output valve means 19 to a fifth reservoir 26; and the third output valve means 20 to a sixth reservoir 27.

In operation, the focal length of the lens body 15 is altered by admitting a preselected one of the three refractive liquids from the reservoirs 1, 2, and 3. The combination of the refractive index of the walls of the lens body 15 and the contents thereof determine the focal length of the lens formed by the lens body 15. During the time that one of the liquids is to be retained in the lens body, the output valves 18, 19, and 20 are left in a normally closed state. When the lens body 15 is to be emptied of the liquid therein, one of the output valves 18, 19, and 20 is energized to an open, or liquid passing state to admit the liquid into the appropriate one of the reservoirs 25, 26 and 27.

The sequence of events, accordingly, to change the focal length of the lens 15 is to empty the lens 15 of the previous liquid by opening an appropriate one of the output valves 18, 19, and 20. The "open" state of the selected valve allows the old liquid in the lens 15 to drain into a corresponding one of the reservoirs 25, 26, and 27. A modification of the embodiment shown in FIG. 1 could include a source of pressurized air selectively admitted to the body 15 to force the old fluid out of the body 15. After a predetermined time interval to allow complete drainage of the lens 15, the selected output valve is closed and a selected one of the input valves 5, 10, and 12 is opened to admit a respective one of the liquids in the reservoirs 1, 2, and 3 into the lens 15. A succeeding change in the focal length would be achieved by a repetition of the above-described sequence. It should be noted that the first, second, and third reservoirs 1, 2, and 3 may be the same devices as the fourth, fifth, and sixth reservoirs 25, 26, and 27, respectively, if the contamination of the three liquids is minimized by a suitable construction of the three output valve means 18, 19, and 20. Alternatively, the three output reservoirs 25, 26 and 27 may be combined into a single storage tank if reuse or separation of the three refractive liquids is either undesired or impractical due to contamination.

In FIG. 2, a deflection system is shown using fluid amplifiers, or logic devices, in place of the valves 5, 10, 12, 18, 19, and 20 shown in FIG. 1. Further, the system shown in FIG. 2 uses a constantly circulating liquid system wherein a selected liquid is circulated through a lens body 30 while the unselected liquids are returned directly to their separate reservoirs. Three reservoirs 31, 32, and 33 contain respective refractive fluids. Three pumps 35, 36, and 37 are arranged to pump the fluids from corresponding ones of the reservoirs 31, 32, and 33. The fluid from each of the pumps 35, 36, and 37 is fed into the input channel of respective fluid amplifiers 40, 41, and 42. One output conduit from each of the fluid amplifiers 40, 41 and 42 is connected to a respective one of the reservoirs 31, 32, and 33. The other output conduit from each of the fluid amplifiers 40, 41, and 42 is connected through a corresponding one of a plurality of isolating fluid diodes 45, 46, and 47 to an input of the fluid lens 30. The output of the lens 30 is connected to the input of a fluid diverter 50. The diverter 50 has three control input ports 51, 52, and 53 which are connected to the lens output legs of respective ones of the fluid amplifiers 40, 41, and 42. Thus, a first control port 51 is connected to the lens output conduit of first fluid amplifier 40. The fluid amplifiers 40, 41, and 42 each have a pair of control ports labeled "set" and "reset" to control the output conduit used by the fluid passing through the fluid amplifier.

The operation of the deflection apparatus of FIG. 2 is similar to that described above with respect to the FIG. 1 embodiment with the exception that the selected fluid is continuously pumped through the lens 30 before returning to the respective one of the reservoirs 31, 32, and 33. Thus, the selection of new fluid for the lens 30 is simply achieved by switching the fluid amplifier supplying the previously used fluid from a "set" to a "reset" state to divert this fluid to its reservoir and setting a desired fluid amplifier to a "set" state to supply a new fluid to the lens 30. In the event that contamination of the fluid is a problem in the embodiment of FIG. 2, the system can be divided into three separate systems using three lens bodies supplied by separate fluid amplifiers, and the diverter 50 could be eliminated in this embodiment. Another variation would include the use of proportional fluid amplifiers concurrently feeding a mixture of refractive liquids which would go to a common reservoir which would be separate from the supply reservoirs.

In FIG. 3, there is shown a light deflection apparatus using a hollow prism body 58 in place of the lens shown in FIGS. 1 and 2. Two fluid reservoirs 59 and 60 are shown in this simplified representation with respective valve means 61 and 62. The output of the prism body 58 is shown as being fed through an output valve means 65 to a common reservoir 66 although the arrangements shown in FIGS. 1 and 2 could be used as well. In operation, the change of refractive liquid in the prism 58 is effective to alter the direction of a light beam passing through the prism. This type of deflection system could be used in a display device where the different available light beam paths would provide an illumination for different respective display messages or characters.

In FIG. 4, there is shown a three prism embodiment of the deflection system shown in FIG. 3. Such an arrangement using three adjacent prism bodies 70, 71, and 72 would avoid any contamination of the fluid while providing a greater overall deflection of the traversing light beam as shown by the angle θ. Further, a modification of the system of FIG. 4 could include adjacent prisms having progressively increasing apex angles to produce a stepped deflection operation.

In FIG. 5, there is shown another embodiment of the invention having a bowl 75 provided with a reflective inner surface. Two exemplary reservoirs 76, 77 having mutually different refractive index liquids therein are connected through fluid valves 79, 80, respectively, to drain pipes discharging into the bowl 75. A center drain 82 in the bowl 75 is connected through an output valve 83 to a common reservoir 84. A change in the liquid in the bowl 75 is effective to alter the focus of the light rays reflected from the inner surface of the bowl 75 through the entrained liquid.

In FIG. 6, there is shown a simplified representation of a light deflecting apparatus using total reflection of a light beam at an interface between two refractive means. A transparent fluid channel 90 is longitudinally divided by a transparent divider 91 into two triangular prism sections. One of these sections, i.e., ABC–EFG is filled with a transparent fluid or other medium having a suitable refractive index. The other section, i.e., ACD–EGH, is connected in the fluid conduit of an output of a fluid amplifier 92. One control input signal to the fluid amplifier 92 diverts the output fluid flow into the fluid channel 90 while another control input signal diverts the fluid flow into a reservoir 93. An output from the fluid channel 90 is, also, connected to the reservoir 93. By a suitable selection of the refractive index of the fluid from the fluid amplifier 92 and the angle of the divider in the channel 90, the absence of a fluid from the fluid amplifier 92 produces a total reflection of a traversing perpendicular light beam entering the channel 90 by exceeding the critical angle at the interface between the channel divider 91 and the empty fluid section. On the other hand, the presence of fluid in the fluid section allows the light beam to pass undisturbed through the fluid channel 90.

In FIG. 7, there is shown an extension of the apparatus shown in FIG. 6 to a deflection system having several available exit paths for a light beam depending on the number of adjacent fluid prisms filled with the refractive fluid.

In FIG. 8, the embodiment shown in FIGS. 6 and 7 is further extended to an X–Y deflection system using a first set of adjacent prism deflectors 98 for an X deflection and a second set of adjacent prism deflectors 99 for a Y deflection. The fluid supply system details in FIGS. 7 and 8 have been omitted for the sake of clarity but it is obvious that any of the previously described arrangements can be used. Obviously, the embodiments presented herein are not exhaustive of the combinations possible using the principles of this invention and, hence, the illustrated systems are only meant to be exemplary rather than limiting the scope of the invention.

What is claimed is:
1. In combination:
two prisms, lying surface-to-surface, and together defining an optical element of rectangular cross-section, at least one of said prisms being hollow and being initially filled with a fluid having substantially the same index of refraction as the other prism, whereby a ray of light entering said element normal to one of the surfaces of said rectangle, passes through both prisms without being deflected; and
means for physically changing the fluid in said one prism to a fluid with a substantially different index of refraction for causing said light to be totally reflected from the surface-to-surface interface between said prisms.

2. In the combination as set forth in claim 1, said means for changing said fluid comprising means for emptying said fluid from said prism.

3. A system for deflecting a ray of radiant energy in two directions comprising, in combination:
a first radiant energy deflection means comprising a plurality of aligned stages which in one condition are all transparent to a ray of radiant energy applied to the stages along a path parallel to their plane of alignment, and each stage of which can be changed to a second condition in which a ray, if it reaches said stage, is totally reflected at an angle perpendicular to said plane;
a second radiant energy deflection means having the same properties as and similar structure to said first means, said second means having its plane of alignment parallel to any ray totally reflected from said first means and being arranged to receive any such totally reflected ray; and means for selectively changing the condition of each stage of said first and second means between ray passing and total ray reflecting conditions.

4. A system as set forth in claim 3, wherein each stage comprises two prisms at least one filled with fluid, the prisms being arranged surface-to-surface and together forming an element of rectangular cross-section.

5. A system as set forth in claim 4, wherein both prisms of each stage are filled with fluid having the same index of refraction and wherein said last-named means comprises means for changing the fluid in at least one of the prisms of a stage to a fluid with a substantially different index of refraction.

6. A system as set forth in claim 5, wherein said radiant energy is light in the visible region of the spectrum.

References Cited
UNITED STATES PATENTS

| | | | |
|---|---|---|---|
| 2,483,102 | 9/1949 | Pierson | 356—134 |
| 3,161,718 | 12/1964 | De Luca | 350—180 |
| 3,249,302 | 5/1966 | Bowles | 235—201PF |
| 1,739,478 | 12/1929 | Bielecki | 350—179 |
| 3,367,733 | 2/1968 | Grau | 350—286 |

DAVID SCHONBERG, Primary Examiner

R. L. SHERMAN, Assistant Examiner

U.S. Cl. X.R.

235—201; 350—160, 268